United States Patent [19]

Sawada et al.

[11] Patent Number: 4,877,549
[45] Date of Patent: Oct. 31, 1989

[54] LIQUID CRYSTAL COMPOSITION

[75] Inventors: Shinichi Sawada, Ichiharashi; Tetsuya Matsushita, Yokohamashi; Toyoshiro Isoyama, Ichiharashi, all of Japan

[73] Assignee: Chisso Corporation, Japan

[21] Appl. No.: 160,188

[22] Filed: Feb. 25, 1988

[30] Foreign Application Priority Data

Mar. 3, 1987 [JP] Japan .................................. 62-48099

[51] Int. Cl.$^4$ .......................... G02F 1/13; C09K 19/30
[52] U.S. Cl. .......................... 252/299.63; 252/299.01; 252/299.6; 252/299.61; 252/299.65; 350/350 R
[58] Field of Search ........... 252/299.63, 299.6, 299.01, 252/299.61, 299.65; 350/350 R

[56] References Cited

U.S. PATENT DOCUMENTS

| | | | |
|---|---|---|---|
| 3,925,482 | 12/1975 | Jacques | 260/612 R |
| 4,130,502 | 12/1978 | Eidenschink et al. | 252/299 |
| 4,405,488 | 9/1983 | Sugimori et al. | 252/299.63 |
| 4,422,951 | 12/1983 | Sugimori et al. | 252/299.63 |
| 4,439,340 | 3/1984 | Kojima et al. | 252/299.63 |
| 4,528,115 | 7/1985 | Ishii et al. | 252/299.63 |
| 4,536,321 | 8/1985 | Sugimori et al. | 252/299.63 |
| 4,620,938 | 11/1986 | Romer et al. | 252/299.63 |
| 4,622,162 | 11/1986 | Kimura et al. | 252/299.63 |
| 4,670,182 | 6/1987 | Fujita et al. | 252/299.63 |
| 4,705,870 | 11/1987 | Takatsu et al. | 252/299.63 |
| 4,705,905 | 11/1987 | Takatsu et al. | 252/299.63 |
| 4,713,468 | 12/1987 | Takatsu et al. | 252/299.63 |

FOREIGN PATENT DOCUMENTS

| | | | |
|---|---|---|---|
| 0209622 | 1/1987 | European Pat. Off. | 252/299.6 |
| 3500897 | 7/1986 | Fed. Rep. of Germany | 252/299.63 |
| 61-5031 | 1/1986 | Japan | 252/299.6 |

OTHER PUBLICATIONS

"A New, Highly Multiplexable Liquid Crystal Display", Scheffer and Nehring, Appl. Phys. Lett. 45, 1021 (1984).

*Primary Examiner*—Teddy S. Gron
*Attorney, Agent, or Firm*—Leydig, Voit & Mayer

[57] ABSTRACT

A liquid crystal composition comprising at least one first component compound of formula (I), at least one second component compound of formula (II) and at least one third component compound of formula (III),

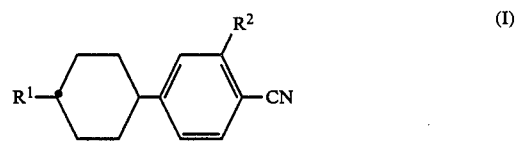

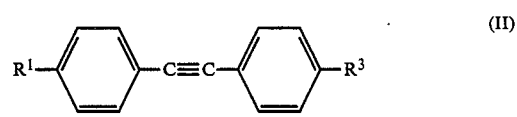

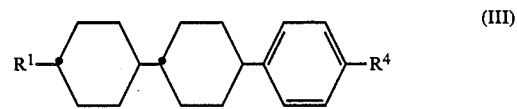

wherein $R^1$ is alkyl of 1 to 8 carbons; $R^2$ is H or F; $R^3$ is alkyl or alkoxy each of 1 to 8 carbons; and $R^4$ is F, —CN, alkyl or alkoxy each of 1 to 8 carbons, the first, second and third component compounds contained in respective amounts of 20–40 wt. %, 10–40 wt. % and 20–50 wt. % and in a total amount of 70 wt. % or more in the composition is provided to improve a steepness of transmission vs. voltage curve in a SBE mode display cell which is operated at a high level of multiplexing.

4 Claims, No Drawings

LIQUID CRYSTAL COMPOSITION

BACKGROUND OF THE INVENTION

The present invention relates to a liquid crystal composition for display devices. More specifically it relates to a liquid crystal mixture used in a display device which is operated at high level of multiplexing.

Along with recent rapid progress in the field of information display devices, especially of a portable visual display terminal of a computer, there is an increasing market demand for a thin and compact-type, power-saving display device having as large a display capacity as that of a cathode-ray tube. Satisfying the above-mentioned requirement of thin and compact shape and reduced power consumption, liquid crystal display devices have been widely used in watches electronic calculators, visual display terminals, etc., in which 90 degree-twisted nematic liquid crystal cells have been driven at multiplexing levels up to 100 lines. However, it is considered to be difficult to elevate the level of multiplexing from a duty ratio of about 1/100 in a 90 degree-twisted nematic display mode, moreover, a higher multiplexing level (over 100 lines) theoretically brings an inferior display quality.

Recently there has been proposed a supertwisted birefringence effect (SBE) mode in which a twist angle of a chiral-doped nematic liquid crystal is fixed in a narrow range very close to the boundary where the electrooptical bistability appears between 180° and 270°.

It is reported by T. J. Scheffer and J. Nehring that, similar to the conventional 90° TN display cell, the SBE display cell may also be operated in a fast scan addressing mode in which the display responds to the root-mean-square value of the applied voltage. It is also reported that the SBE display shows a better contrast and a wider viewing cone than the conventional TN display. (Refer to Appl. Phys. Lett. 45, 1021 (1984)).

Liquid crystal mixtures for the SBE mode display cell are required to have the following characteristics,
(1) a steepness in transmission versus voltage characteristic;
(2) a high nematic-isotropic phase transition temperature;
(3) an optimum value of an optical anisotropy (hereinafter abbreviated to $\Delta n$) applicable to a cell thickness (abbreviated to d);
(4) a low viscosity; and so forth.

The characteristics described in above items (2) to (4) are also necessary for the conventional TN display cell. The characteristic of item (2) is especially required in the SBE mode for preventing the display from changing hue accompanied by the temperature dependence of the optical anisotropy of liquid crystals; therefore a clearing point of 70° C. or higher is desired for the material used in the SBE mode display. The characteristic of item (4) is effective in reducing a response time of a liquid crystal cell, particularly of a SBE display cell having a twist angle smaller than 240° together with a pre-tilt angle smaller than 6°.

SUMMARY OF THE INVENTION

An object of the present invention is to provide a nematic liquid crystal mixture having an improved steepness in transmission versus voltage curve in SBE mode display, together with a high clearing point, a low viscosity, and a desired $\Delta n$ value as previously mentioned. Another object of the present invention is to provide a liquid crystal display element having a good contrast and an improved steepness in transmission-voltage curve in SBE display mode.

The present invention in a first aspect resides in
(1) a liquid crystal composition, comprising:
(a) 20 to 40% by weight of a first component consisting of at least one compound expressed by the formula

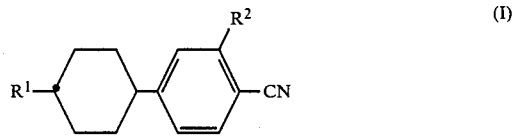

(I)

wherein $R^1$ is an alkyl group of 1 to 8 carbon atoms; and $R^2$ is a hydrogen atom or a fluorine atom;
(b) 10 to 40% by weight of a second component consisting of at least one compound expressed by the formula

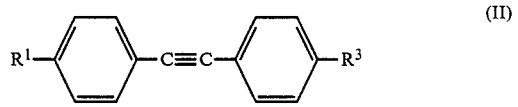

(II)

wherein $R^1$ is as defined as above; and $R^3$ is an alkyl group or an alkoxy group each of 1 to 8 carbon atoms; and
(c) 20 to 50% by weight of a third component consisting of at least one compound expressed by the formula

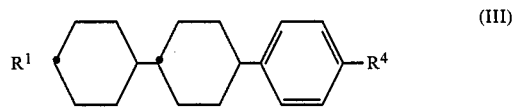

(III)

wherein $R^1$ is as defined as above; and $R^4$ is a fluorine atom, a cyano group, an alkyl group or an alkoxy group each of 1 to 8 carbon atoms, the first, second and third components being contained in a total amount of 70% by weight or more in the composition.
(2) a liquid crystal composition according to item (1), wherein the first component consists of at least one compound expressed by the formula

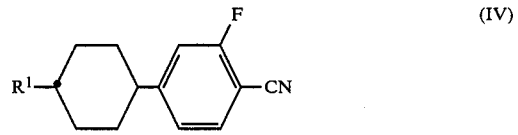

(IV)

wherein $R^1$ is an alkyl group of 1 to 8 carbon atoms, and
(3) a liquid crystal composition according to item (1), wherein the first component consists of at least one compound expressed by the formula

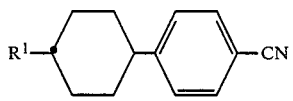

(V)

wherein R¹ is an alkyl group of 1 to 8 carbon atoms.

The present invention in a second aspect resides in (4) a liquid crystal display element comprising a liquid crystal composition as defined in any one of the above items (1) to (3).

DESCRIPTION OF THE PREFERRED EMBODIMENTS

A content of the first component compound of formula (I) is preferably 20 to 40% by weight in the present invention. When the content of the first component compound is less than 20% by weight in the composition, the threshold voltage of the resulting liquid crystal element is not reduced sufficiently. When the content of the first component compound exceeds 40% by weight in the composition, the clearing point of the liquid crystal composition tends to fall and consequently the temperature dependence of the optical anisotropy value ($\Delta n$) of the composition increases causing bad influence of an undesirable hue change the resulting display. Thus, the content of the first component compound exceeding 40% by weight is excluded.

A content of the second component compound of formula (II) is preferably 10 to 40% by weight in the composition. When the content of the second component compound is below 10% by weight in the composition, a satisfactory value of $\Delta n$ of the resulting composition is not obtained. When the content of the second component compound exceeds 40% by weight in the composition, the clearing point of the resulting composition tends to decline with the consequence that the resulting display is accompanied by the bad influence as described above.

A content of 20 to 50% by weight of the third component compound of formula (III) is preferable. When the content of the third component compound is less than 20% by weight in the composition, the clearing point of the resulting composition is not increased sufficiently. The content of the third component compound exceeding 50% by weight in the composition is accompanied by a rise in the lower limit temperature of the nematic phase of the composition, and consequently it causes a decrease in the operating temperature range of the display element at the low temperature side which is undesirable. Further, a total amount of the first, second and third components is preferably 70% by weight or more in the composition. When the total amount is not more than 70% by weight, the objective characteristics of the composition may not be satisfactory.

The present invention has improved the steepness of the transmission versus voltage characteristic, keeping a balance of the various characteristics of the liquid crystal composition required for an SBE display mode, such as a high clearing point, a low viscosity, and a controllable value of optical anisotropy.

As is known from the prior art, a steepness value $\alpha$, as defined by equation (1), described later, is desired, in a time-multiplexed display mode, to be a value approaching as close to 1 as possible. The present invention has realized a steepness value $\alpha$ very close to 1 in the liquid crystal display element, which is considered to be due to a great contribution of the component compounds of the formulas (I), (II) and (III). Such contribution is clearly shown in the examples and a comparative example, each described later.

In addition to the improvement in the steepness value $\alpha$ of the transmission versus voltage curve, a viscosity of the composition may also be improved by mixing component compounds of formulas (I), (II) and (III) as major components in a preferred proportion.

Since the liquid crystal composition of the present invention is provided with various features as described above, it is possible to drive a SBE display cell at a high level of time-multiplexing of over 100 lines by employing the composition.

Since the composition has a high clearing point together with a low viscosity, it is, of course, possible to use the composition in a conventional TN display mode where the steepness of transmission versus voltage curve is not necessarily required.

In the present invention, a steepness of transmission versus voltage characteristic of a display is defined by the equation $$\alpha = V_{80}/V_{10} \qquad (1)$$

wherein $V_{10}$ means the threshold voltage at which 10% transmission is observed in the optical axis direction vertical to the display surface and $V_{80}$ means the saturation voltage at which 80% transmission is observed in the same direction as that in case of $V_{10}$. Then, the equation means that the closer to 1 a value of parameter $\alpha$ is, the steeper a transmission versus voltage curve is.

Further, a parameter Nmax expressing a maximum number of scanned lines in multiplexed drive is defined by the equation $$N_{max} = \left( \frac{\alpha^2 + 1}{\alpha^2 - 1} \right)^2 \qquad (2)$$

which means that the larger a value of the parameter is, the higher a level of multiplexing is.

The present invention will be described by way of examples, but it is not construed to be limited thereto. In the following example and comparative example, a content of a component will be expressed by way of percent by weight.

EXAMPLE 1

A liquid crystal composition consisting of the two following compounds of the formula (I):
4-(trans-4-ethylcyclohexyl)-2-fluorobenzonitrile: 10%
4-(trans-4-propylcyclohexyl)-2-fluorobenzonitrile: 10%
four following compounds of the formula (II):
4-ethyl-4'-methyldiphenylacetylene: 10%
4-ethyl-4'-hexyldiphenylacetylene: 10%
4-methyl-4'-hexyldiphenylacetylene: 5%
4,4'-dibutyldiphenylacetylene: 5%
five following compounds of the formula (III):
4-[trans-4-(trans-4-propylcyclohexyl)cyclohexyl]-benzonitrile:
4-]trans-4-(trans-4-propylcyclohexyl)cyclohexyl]toluene:
4-[trans-4-(trans-4-propylcyclohexyl)cyclohexyl]-1-propylbenzene: 17%
4-[trans-4-(trans-4-propylcyclohexyl)cyclohexyl]-1-fluorobenzene: 4%

4-[trans-4-(trans-4-propylcyclohexyl)cyclohexyl]-1-methoxybenzene: 5%
and a compound excluded from the formulas (I) to (III),
4-fluorophenyl trans-4-(trans-4-propylcyclohexyl)cyclohexanecarboxylate: 10%
was prepared. This composition exhibited a clearing point of 86.2° C., an optical anisotropy value of 0.140, and a viscosity value at 20° C. of 17.4 centipoise. A chiral dopant produced by E. Merck and having a designation number of S-811 was added to the composition in a small amount so that the following cell parameters were established $$d \cdot \Delta n = 0.9$$

and $$d/P = 0.5$$

wherein d was cell thickness and P was an intrinsic helical pitch of the resulting chiral doped liquid crystal composition, which was kept in a cell having a pair of rubbed polyimide aligning films and a small tilt angle (<3°) together with a twist angle of 180°.

The liquid crystal cell prepared as above had a threshold voltage of 2.15 V at 25° C., and a steepness parameter α of 1.080, from which a parameter Nmax of 170 was derived.

EXAMPLE 2

A liquid crystal composition consisting of the two following compounds of the formula (I),:
4-(trans-4-ethylcyclohexyl)benzonitrile: 12%
4-(trans-4-propylcyclohexyl)benzonitrile: 16%
three following compounds of the formula (II):
4-ethyl-4'-methyldiphenylacetylene: 10%
4-ethyl-4'-hexyldiphenylacetylene: 10%
4-methyl-4'-hexyldiphenylacetylene: 5%
five following compounds of the formula (III):
4-[trans-4-(trans-4-propylcyclohexyl)cyclohexyl]benzonitrile: 7%
4-[trans-4-(trans-4-propylcyclohexyl)cyclohexyl]toluene: 6%
4-trans-4-(trans-4-propylcyclohexyl)cyclohexyl]-1-propylbenzene: 17%
4-[trans-4-(trans-4-propylcyclohexyl)cyclohexyl]-1-fluorobenzene: 4%
4-[trans-4-(trans-4-propylcyclohexyl)cyclohexyl]-1-methoxybenzene: 5%
and a compound excluded from the formulas (I) to (III):
4-ethoxyphenyl trans-4-butylcyclohexanecarboxylate: 8%
was prepared to observe its properties in a similar manner to that in Example 1. The results are shown in Table 1 together with those of Example 1.

EXAMPLE 3

A liquid crystal composition consisting of two following compounds of the formula (I):
4-(trans-4-ethylcyclohexyl)-2-fluorobenzonitrile: 20%
4-(trans-4-propylcyclohexyl)-2-fluorobenzonitrile: 20%
a following compound of the formula (II):
4-ethyl-4'-methyldiphenylacetylene: 10%
and four following compounds of the formula (III):
4-[trans-4-(trans-4-propylcyclohexyl)cyclohexyl]benzonitrile: 10%
4-[trans-4-(trans-4-propylcyclohexyl)cyclohexyl]toluene: 10%
4-[trans-4-(trans-4-propylcyclohexyl)cyclohexyl]-1-propylbenzene: 20%
4-[trans-4-(trans-4-propylcyclohexyl)cyclohexyl]-1-fluorobenzene: 10%
was prepared to observe its properties in a similar manner to that in Example 1. The results are shown in Table 1.

EXAMPLE 4

A liquid crystal composition consisting of the two following compounds of the formula (I):
4-(trans-4-ethylcyclohexyl)benzonitrile: 14%
4-(trans-4-ethylcyclohexyl)-2-fluorobenzonitrile: 10%
four following compounds of the formula (II):
4-ethyl-4'-methyldiphenylacetylene: 10%
4-ethyl-4'-hexyldiphenylacetylene: 10%
4-methyl-4'-hexyldiphenylacetylene: 5%
4,4'-dibutyldiphenylacetylene: 5%
five following compounds of the formula (III):
4-[trans-4-(trans-4-propylcyclohexyl)cyclohexyl]benzonitrile: 7%
4-[trans-4-(trans-4-propylcyclohexyl)cyclohexyl]toluene: 7%
4-[trans-4-(trans-4-propylcyclohexyl)cyclohexyl]-1-propylbenzene: 13%
4-[trans-4-(trans-4-propylcyclohexyl)cyclohexyl]-1-methoxybenzene: 5%
4-[trans-4-(trans-4-propylcyclohexyl)cyclohexyl]-1-fluorobenzene: 4%
and one compound excluded from the formulas (I) to (III),
4-fluorophenyl trans-4-(trans-4-propylcyclohexyl)cyclohexanecarboxylate: 10%
was prepared to observe its properties in a similar manner to that in Example 1. The results are shown in Table 1.

EXAMPLE 5

A liquid crystal composition consisting of one following compound of the formula (I):
4-(trans-4-propylcyclohexyl)benzonitrile: 40%
four following compounds of the formula (II):
4-ethyl-4'-methyldiphenylacetylene: 10%
4-ethyl-4'-hexyldiphenylacetylene: 10%
4-methyl-4'-hexyldiphenylacetylene: 5%
4,4'-dibutyldiphenylacetylene: 5%
and two following compounds of the formula (III):
4-[trans-4-(trans-4-propylcyclohexyl)cyclohexyl]benzonitrile: 10%
4-[trans-4-(trans-4-propylcyclohexyl)cyclohexyl]-1-propylbenzene: 20%
was prepared to observe its properties in a similar manner to that in Example 1. The results are shown in Table 1.

EXAMPLE 6

A liquid crystal composition consisting of one following compound of the formula (I):
4-(trans-4-propylcyclohexyl)benzonitrile: 40%
three following compounds of the formula (II):
4-ethyl-4'-methyldiphenylacetylene: 10%
4-ethyl-4'-hexyldiphenylacetylene: 10%
4-propyl-4'-butoxydiphenylacetylene: 10%
two following compounds of the formula (III):
4-[trans-4-(trans-4-propylcyclohexyl)cyclohexyl]benzonitrile: 10%
4-[trans-4-(trans-4-propylcyclohexyl)cyclohexyl]-1-propylbenzene: 10% and one compound excluded from the formulas (I) to (III),
4-ethoxyphenyl trans-4-butylcyclohexanecarboxylate: 10%
was prepared to observe its properties in a similar manner to that in Example 1.

EXAMPLE 7

A liquid crystal composition consisting of one following compound of the formula (I):
4-(trans-4-propylcyclohexyl)benzonitrile: 40%
two following compounds of the formula (II),
4-ethyl-4'-methyldiphenylacetylene: 10%
4-propyl-4'-butoxydiphenylacetylene: 10%
two following compounds of the formula (III):
4-[trans-4-(trans-4-propylcyclohexyl)cyclohexyl]benzonitrile: 10%
4-[trans-4-(trans-4-propylcyclohexyl)cyclohexyl]-1-propylbenzene: 20%
and one compound excluded from the formulas (I) to (III),
2-(4-ethylphenyl)-5-ethylpyrimidine: 10% was prepared to observe its properties in a similar manner to that in Example 1. The results are shown in Table 1.

COMPARATIVE EXAMPLE

A liquid crystal composition consisting of:
4-ethyl-4'-cyanobiphenyl: 15%
4-butyl-4'-cyanobiphenyl: 10%
4-butoxyphenyl trans-4-propylcyclohexanecarboxylate: 16%
4-ethoxyphenyl trans-4-butylcyclohexanecarboxylate: 12%
4-methoxyphenyl trans-4-pentylcyclohexanecarboxylate: 12%
4-ethoxyphenyl trans-4-propylcyclohexanecarboxylate: 10%
4-ethoxyphenyl trans-4-pentylcyclohexanecarboxylate: 10%
and
4-(trans-4-pentylcyclohexyl)-4'-cyanobiphenyl: 15%
was prepared to compare its properties with those of exemplified compositions of the present invention. The comparative composition is one of the compositions which have been widely used in the conventional 90° twisted nematic display cells operated under the time-multiplexing drive. The properties of the composition was observed in a similar manner to that in Example 1, and the results are shown in Table 1.

TABLE 1

| Properties | Example 1 | 2 | 3 | 4 | 5 | 6 | 7 | Comp. example |
|---|---|---|---|---|---|---|---|---|
| Clearing point [°C.] | 86.2 | 80.8 | 79.5 | 78.1 | 73.1 | 74.3 | 70.6 | 78.8 |
| Optical anisotropy | 0.140 | 0.139 | 0.115 | 0.138 | 0.151 | 0.159 | 0.146 | 0.142 |
| Viscosity at 20° C. | 17.4 | 15.5 | 20.0 | 16.2 | 13.2 | 15.1 | 14.8 | 33.9 |
| $V_{10}$ at 25° C. [V] | 2.150 | 2.200 | 1.580 | 2.010 | 1.920 | 1.980 | 1.870 | 2.030 |
| α at 25° C. | 1.080 | 1.092 | 1.096 | 1.084 | 1.088 | 1.086 | 1.090 | 1.12 |
| Nmax at 25° C. | 170 | 130 | 120 | 154 | 141 | 147 | 135 | 79 |

What is claimed is:
1. A liquid crystal composition usable in a supertwisted birefringence effect display, comprising:
(a) 20 to 40% by weight of a first component consisting of at least one compound expressed by the general formula:

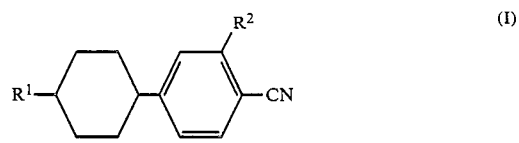

wherein R is an alkyl group of 1 to 8 carbon atoms; and $R^2$ is a hydrogen atom or a fluorine atom;
(b) 10 to 40% by weight second component consisting of at least one compound expressed by the general formula:

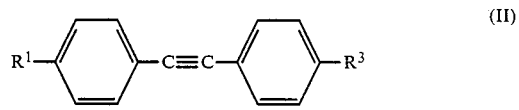

wherein $R^1$ is defined above; and $R^3$ is an alkyl group or an alkoxy group each of 1 to 8 carbon atoms; and
(c) 20 to 50% by weight third component consisting of at least one compound expressed by the general formula:

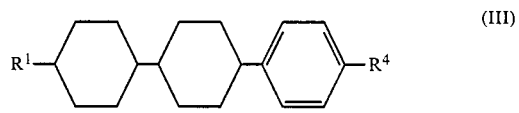

wherein $R^1$ is as defined above; and $R^4$ is a fluorine atom, a cyano group, or an alkyl group or an alkoxy group each of 1 to 8 carbon atoms;
said first, second and third components being contained in a total amount of 70% by weight or more in said composition.

2. A liquid crystal composition according to claim 1, in which said first component consists of at least one compound expressed by the formula:

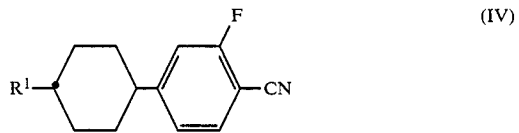

wherein $R^1$ is an alkyl group of 1 to 8 carbon atoms.

3. A liquid crystal composition according to claim 1, in which said first component consists of at least one compound expressed by the formula:

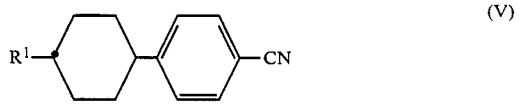

wherein $R^1$ is an alkyl group of 1 to 8 carbon atoms.

4. A supertwisted birefringence effect liquid crystal display element, comprising a liquid crystal cell containing a composition which comprises:
(a) 20 to 40% by weight of a first component consisting of at least one compound expressed by the formula:

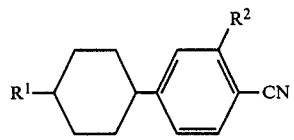

(I)

wherein $R^1$ is an alkyl group of 1 to 8 carbon atoms; and $R^2$ is a hydrogen atom or a fluorine atom;

(b) 10 to 40% by weight of a second component consisting of at least one compound expressed by the formula:

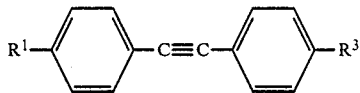

(II)

wherein $R^1$ is as defined as above; and $R^3$ is an alkyl group or an alkoxy group each of 1 to 8 carbon atoms; and (c) 20 to 50% by weight of a third component consisting of at least one compound expressed by the formula:

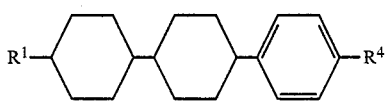

(III)

wherein $R^1$ is as defined as above; and $R^4$ is a fluorine atom, a cyano group, or an alkyl group or an alkoxy group each of 1 to 8 carbon atoms; said first, second and third components being contained in a total amount of 70% by weight or more in said composition.

* * * * *